United States Patent Office 3,341,114
Patented Sept. 12, 1967

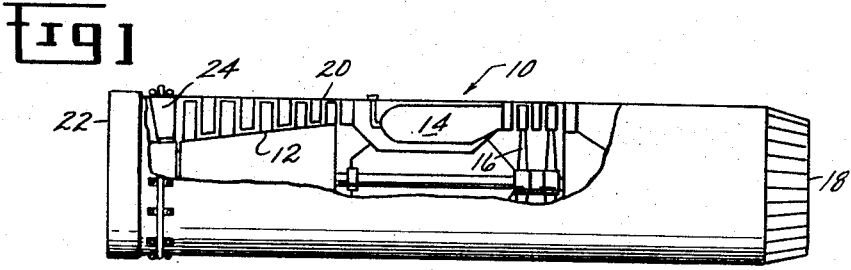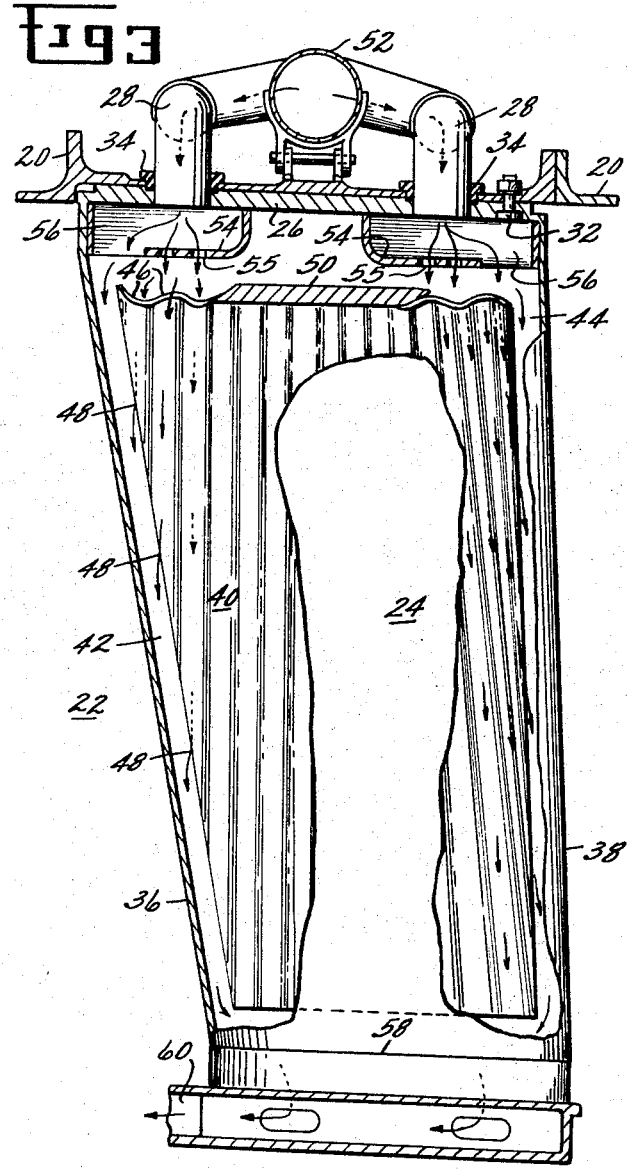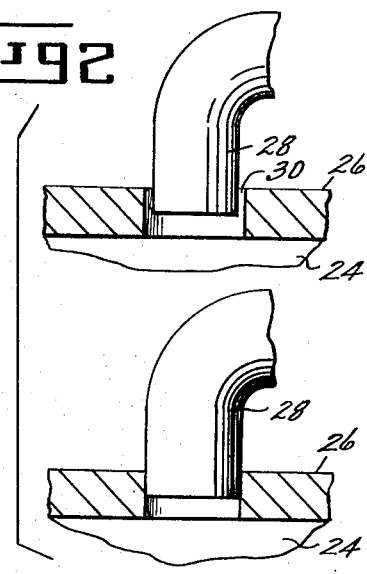
INVENTOR.
HAROLD A. LARSON

3,341,114
ANTI-ICING MEANS
Harold A. Larson, Cincinnati, Ohio, assignor to General
Electric Company, a corporation of New York
Filed Mar. 4, 1966, Ser. No. 531,954
9 Claims. (Cl. 230—132)

The present invention relates to anti-icing means and, more particularly, to anti-icing means as especially adapted for the inlet guide vanes of a turbine engine.

Turbine engines require a means for eliminating the build-up of ice on compressor stator hardware such as the inlet guide vanes under certain flight operating conditions. It is generally customary to employ hot air from the compressor which is passed through any hardware that is subject to ice accumulation and various means have been proposed to do this. One of the difficulties in the prior art arrangements has been the use of too much air. For example, it is possible to pump air through a hollow inlet guide vane but any air removed from the compressor represents high pressure air loss so that only the exact minimum amount required should be used for anti-icing purposes. Additionally sealing problems are presented in the ducting of the hot fluid.

The main object of the present invention is to provide an anti-icing means for a gas turbine powerplant that overcomes the leakage problems and uses a minimum amount of hot air for maximum cooling.

Another object is to provide such a means which uses the concept of differential sealing to avoid the need for additional and complex separate seals between the dissimilar metals of the vane and the piping or duct work.

A further object is to provide an anti-icing means which effectively operates for de-icing purposes with a unique distributing system within the vane.

A further object is to provide such an anti-icing means for the vane structure which employs a minimum temperature drop and therefore uses a minimum amount of air.

Another object is to provide such a means wherein the vane structure uses baffling to further minimize the amount of air required for effective anti-icing.

Briefly stated, the invention is directed to an anti-icing means for use preferably in a gas turbine powerplant that has an axial flow compressor with a casing and a bladed rotor operating within the casing. The anti-icing means is directed to the stationary hollow inlet guide vane structure which extends radially across the compressor inlet, the hollow inlet guide vanes having leading and trailing edges. The inlet guide vanes are provided with internal continuous passages extending lengthwise of and at the leading and trailing edges. An air distribution system is provided by a corrugated-like member disposed within each vane substantially lengthwise of the vane and performing a dual function of an internal support for the vane and a fluid conduit within the vane. Hot fluid is provided by a manifold preferably supported on the casing and separate duct means are connected to the manifold and to the respective leading and trailing edge passages to feed each passage. The corrugations are disposed at an angle or canted to the edges to form a progressive series of openings along and into the edge internal passage and provide a constantly fluid replenishing structure for the passage. Additionally, means are provided for removing the fluid. A simplified form uses a radially directed corrugated member and the leading edge of the inlet guide vane is swept back radially inward. Further, the central portion of the corrugated member is blocked from the hot fluid and baffles are suitably provided within the vane opposite the duct means to direct fluid to the passages. Further, a sleeve may be provided adjacent each duct and spaced from the vane to prevent fluid scrubbing and hot spots on the vane. The invention also contemplates the use of different materials for the vane and the duct with the duct having a higher coefficient of thermal expansion. In this form as when the same materials are used, the duct means is loosely connected to the passages to form a predetermined space with the vane in the cold operation so that expansion under hot operation forms a tight fit between the duct and the vane to seal between the members and avoid the need for any complex sealing structure. The invention further contemplates the use of an airfoil of the type described with the canted or angled internal corrugations accepting all the fluid for constant replenishing whether the airfoil is used as an inlet guide vane or other purposes in the engine.

While the specification concludes with claims particularly pointing out and distinctly claiming the subject matter which is regarded as the invention, it is believed the invention will be better understood from the following description taken in connection with the accompanying drawing, in which:

FIGURE 1 is a general outline of a typical gas turbine powerplant showing the location of the anti-icing means;

FIGURE 2 is a partial diagrammatic view of the spacing arrangment between the duct and the vane in the cold and hot sealed position; and FIGURE 3 is a detailed portion cross sectional and broken view of the arrangement of the anti-icing means for a particular vane.

Referring first to FIGURE 1, there is shown a general diagrammatic outline of a gas turbine powerplant generally indicated at 10. Such a powerplant includes a typical axial flow compressor 12, a combustor section 14, a turbine 16 and a nozzle 18 all of which are housed within a casing 20 and cooperate to produce thrust in the conventional fashion. In such a powerplant, at the compressor inlet 22, there is generally provided an inlet airfoil guide vane 24 whose function is one of supporting and guiding the air at the proper angle into the rotating compressor 12. Because of their position the inlet guide vanes 24 tend to build up a coating of ice at various operating conditions. In order to remove the ice, it is customary to pump hot fluid through the hollow inlet guide vanes 24 in order to melt the ice which then passes through the compressor or to prevent the build-up in the first place.

Referring next to FIGURE 2, there is shown a diagrammatic view of the radially outer end of a typical inlet guide vane 24. In such an arrangement, it is customary to duct hot cooling fluid into the vane cap 26 by a duct means 28. For various reasons, vane 24 and duct 28 are of different materials and have different coefficients of thermal expansion and expand at unequal rates under temperature. Inasmuch as no anti-icing fluid is directed into the vane through duct 28 in the inoperative or cold condition of the engine, the parts assume the position shown at the top of FIGURE 2. In other words, a typical installation may use different materials such as a titanium vane 24 and a steel duct 28. The titanium, having a lower coefficient of thermal expansion will not expand as much as the steel duct 28 under temperature. Consequently, the parts are selected to form a predetermined space 30 therebetween so that the duct 28 is thereby loosely connected to the vane 24 and the internal passages as will become apparent as the description proceeds and as shown at the top of FIGURE 2. Under operation, this predetermined space 30 is completely closed so that the parts assume the position shown in the bottom portion of FIGURE 2 and a tight structureless seal between duct 28 and vane 24 is formed. Actually, the predetermined space 30 is selected so that, upon expansion during operation with hot fluid passing through the parts, the expansion of the parts is such that duct 28 forms a tight fit in vane 24 or has, in effect, a force fit therein to form a complete seal between the parts with no need for a special seal to be used. Inasmuch as the hot fluid passing into the vane represents the anti-icing condition, it is important that it not be wasted so that it is necessary to have the seal between the parts as shown at the bottom of FIGURE 2.

Referring next to FIGURE 3, the internal structure of a typical vane and the means for de-icing it are shown. The vane 24 is set into the casing 20 with suitable bolting means 32 which extend through and support the cap 26 as shown. While not required for hot sealing purposes, suitable insulation 34 may be used around the ducts 28 to prevent any leakage during cold operation. However, this insulation forms no sealing during the hot operation which is formed by the metal-to-metal contact as previously described with reference to the predetermined spacing in FIGURE 2. Each individual inlet guide vane 24 is formed of a hollow component of sheet metal in the usual fashion which component has a leading edge 36 and a trailing edge 38. For supporting the surfaces of the hollow component and forming conduits therein, there is provided a corrugated-like member 40 extending generally lengthwise of the vane or radially with respect to the engine centerline. The internal portion of the inlet guide vanes is also provided with continuous passages extending lengthwise of the leading and trailing edges at 42 and 44 respectively. Because of the need to use minimum fluid and progressively heat the entire length of the leading and trailing edges of the guide vane, these passages 42 and 44 extend the full length of the vane and are continuous throughout as shown. The airfoil surfaces are attached by any suitable means to the opposite corrugations of the corrugated-like member 40 whereby the member provides support for the hollow guide vane. Additionally, and more importantly, the individual corrugations of the member 40 form lengthwise individual conduits 46 that are alternately on opposite sides of the corrugated member 40 as shown. As thus far described, a corrugated support within a hollow vane is well known and no invention is claimed for such arrangement per se. In the instant invention however, the corrugated member 40 performs a unique additional function by its structural arrangement with respect to the leading and trailing edges of the individual vanes. It will be apparent that hot air introduced through duct 28 will flow down under pressure through passage 42 and the individual conduits 46 in the corrugations. The flow of the fluid down passage 42 provides de-icing of the leading and trailing edges of the entire vane. However, it will be apparent that the air cools rapidly as it flows radially inward so that its de-icing characteristics at the radially inner end or lower portion of FIGURE 3 are poor unless large quantities of air are supplied to provide enough heat to de-ice. In order to provide a constant replenishment of this cooled air as it flows downward, the corrugated-like member 40 is arranged at an angle to the edges whereby there is formed a series of openings 48 that are progressive down the edges of the vane as shown in FIGURE 3. Each one of these openings of course replenishes the hot air or fluid supply to the edges of the vane at its respective passage 42 in a progressive manner. Consequently, the minimum amount of air may be used with the assurance that the structure described of the progressive openings 48 will provide a constantly fluid replenishing arrangement along the internal passage at the edges or the parts to be heated. This permits a much smaller supply of air to be used and allows that air to be used more efficiently than prior arrangements since the heat absorption rate is much larger at the leading portion of the vane than on the side portions of the vane. In this manner, there is not as much heat removed from the air. By the efficient entry of air through constantly replenishing it, it is not necessary to take out as much heat as though all the air had gone all the way down either edge. Thus, a minimum temperature drop across the inlet and outlet is provided and this results in using less air more efficiently.

Inasmuch as the central portion of the vane does not require the necessary de-icing hot fluid it may be conveniently blocked off by a blocking member 50 so that only a few corrugations at the leading and trailing edges are used. This again results in less air and more efficient use of the air. It will be apparent that the substantially lengthwise extension of the corrugations and the angle with the edges may be made in the manner shown in FIGURE 3 or the corrugated member may be canted slightly to still make an angle with respect to the edges. It has been found convenient to form the angle with the leading edge of the guide vane in the manner shown by having the guide vane leading edge swept radially inwardly as shown. Further, it will be apparent that the corrugated member, by making an angle with the edges may take many forms. The important feature is that each edge and the corrugated member are canted with respect to one another to form an angle to provide the progessive series of openings 48 for the constant replenishment of the fluid along the edges and any structural arrangement providing for this will suffice.

In order to direct the air into the vanes a suitable manifold 52 is supported preferably on the casing and feeds the separate duct means 28 for both the leading and trailing edges in the bifurcated arrangement shown. The possibility of hot spots directly below the duct means 28 exists and to alleviate this there is provided, within the vane opposite the respective ducts, baffle members 54 which, in cooperation with the opening from the ducts, permits the incoming hot fluid to be diffused above the baffles and be directed over the end and through suitable holes 55 into the corresponding conduits 46. These baffles are provided at both the leading and trailing edges as shown. Additionally, because the velocity of the entering fluid may be high, in order to avoid any scrubbing effect on the vane directly by the hot fluid and consequent creation of hot spots, there may be provided a sleeve 56 which is disposed adjacent each duct means 28 within the vane and spaced from the vane. This sleeve, being a non-structural and non-load carrying member, thus forms an insulator or directing member for the hot entering fluids. It can take the high velocities and temperatures of the hot fluid because of its non-structure characteristic. It also tends to keep the entering fluids away from the center portion of the corrugated member even though it is blocked off by blocking member 50. Thus, the sleeve and baffle members tend to prevent any hot spots at the vane inlet as well as directing fluid to the passages 42 and 44.

It will be apparent that the warm fluid, after de-icing the inlet guide vane, may be used elsewhere as desired. To this end, any outlet means 58 is provided from the vane to direct the warm air elsewhere for other purposes. For example, the air may be directed forwardly as shown to be used to de-ice any forward directed member through means 60 after which the air may be returned to the cycle in conventional fashion.

It should be appreciated that the anti-icing means shown is not confined to an inlet guide vane but may be used elsewhere in gas turbine powerplants of the general type described wherein airfoil members are constructed in the manner described of the corrugated member serving the dual purpose of support as well as the conduit for the passage of all the hot fluid toward the areas to be heated. By the angular or canted relationship between the individual corrugated supporting member 40 and the edges 36 and 38 respectively, the minimum amount of cooling air and minimum temperature drop may be employed to provide adequate heating by the progressive series of openings into the internal passages and thereby provide the constantly fluid replenishing structure to these passages with the results described.

While there have been described preferred forms of the invention, obvious equivalent variations are possible in light of the above teachings. It is therefore to be understood that within the scope of the appended claims, the invention may be practiced otherwise than as specifically described, and the claims are intended to cover such equivalent variations.

I claim:
1. In a gas turbine powerplant including a compressor having a casing with a bladed rotor therein, anti-icing means at the compressor inlet comprising,
stationary hollow inlet guide vanes having leading and trailing edges with internal continuous passages,
a corrugated-like supporting member disposed substantially lengthwise of each vane to form conduits therein,
duct means connected to said casing and said vanes to introduce hot fluid for heating said vanes,
said corrugations being disposed at an angle to the edges to be heated whereby all the hot fluid is directed by said corrugations toward the edges to be heated, said corrugations forming a series of openings and providing a constantly fluid replenishing structure along the internal passage at said edges, means for removing said fluid.

2. Apparatus as described in claim 1 wherein the central portion of said corrugated member is blocked from hot fluid entry and baffles are provided within said vane opposite said duct means to direct said fluid to said passages.

3. Apparatus as described in claim 2 wherein a sleeve is disposed adjacent said duct means within said vane and spaced from said vane.

4. In a gas turbine powerplant including an axial flow compressor having a casing with a bladed rotor therein, anti-icing means at the compressor inlet comprising,
stationary hollow inlet guide vanes extending radially across the compressor inlet and having leading and trailing edges,
internal continuous passages extending lengthwise of said edges,
a corrugated-like member disposed within each vane substantially lengthwise thereof and forming an internal support for said vane and conduits therein,
a manifold for hot fluid supported on said casing,
separate duct means connected to said manifold and to said leading and trailing edge passages respectively,
said corrugations being disposed at an angle to the edges to be heated whereby all the hot fluid is directed by said corrugations toward the edges to be heated, said corrugations forming a progressive series of openings along and into said edge internal passages and providing a constantly fluid replenishing structure to said passages, and
means for removing said fluid.

5. Apparatus as described in claim 4 wherein said vane and duct are of different materials with said duct having a higher coefficient of thermal expansion and said duct means is loosely connected to said passages to form a predetermined space with said vane when cold and is expanded to form a tight fit therewith in operation with said hot fluid therein.

6. Apparatus as described in claim 4 wherein said corrugated member is radially disposed in said vane with respect to the compressor centerline, and said leading edge is swept radially inward.

7. Apparatus as described in claim 6 wherein the central portion of said corrugated member is blocked from hot fluid entry and baffles are provided within said vane opposite the respective duct means to direct fluid to said passages.

8. Apparatus as described in claim 7 wherein a sleeve is disposed adjacent each duct means within said vane and spaced from said vane.

9. An airfoil for use in a gas turbine powerplant of the type described comprising,
a hollow component having leading and trailing edges, continuous internal passages in said component extending the length of said edges,
a corrugated-like member disposed in the hollow component connected to and supporting the opposite surfaces of said component and forming conduits generally lengthwise of said hollow component,
means for introducing and removing fluid from said component, and
said member being disposed in said conduit to form an angle with the edges whereby all the fluid is directed by said corrugations toward the edges, said corrugations forming a progressive series of openings into each of said respective edge passages and providing a constantly fluid replenishing structure to said passages.

References Cited

UNITED STATES PATENTS

| 2,264,297 | 12/1941 | Clay | 244—134 |
| 2,556,736 | 12/1951 | Palmatier | 244—134 |
| 2,625,367 | 1/1953 | Rainbow et al. | 253—39.1 |
| 2,823,894 | 2/1958 | Gerdan et al. | 253—39.15 |
| 2,888,243 | 5/1959 | Pollock | 253—39.1 |
| 2,963,269 | 12/1960 | Gerdan et al. | 253—39.15 |

FOREIGN PATENTS

| 491,903 | 4/1953 | Canada. |
| 666,536 | 2/1952 | Great Britain. |
| 676,314 | 7/1952 | Great Britain. |
| 774,499 | 5/1957 | Great Britain. |

DONLEY J. STOCKING, *Primary Examiner.*

H. F. RADUAZO, *Assistant Examiner.*